(12) United States Patent
Arnaud

(10) Patent No.: US 6,875,351 B2
(45) Date of Patent: Apr. 5, 2005

(54) METHODS AND APPARATUS FOR OIL DEMULSIFICATION AND SEPARATION OF OIL AND SUSPENDED SOLIDS FROM PRODUCED WATER

(75) Inventor: Johnny Arnaud, Houston, TX (US)

(73) Assignee: Hydrotreat, Inc., Houston, TX (US)

( * ) Notice: Subject to any disclaimer, the term of this patent is extended or adjusted under 35 U.S.C. 154(b) by 140 days.

(21) Appl. No.: 10/316,984

(22) Filed: Dec. 11, 2002

(65) Prior Publication Data

US 2004/0031742 A1 Feb. 19, 2004

Related U.S. Application Data

(63) Continuation-in-part of application No. 09/879,496, filed on Jun. 12, 2001, now Pat. No. 6,669,843.

(51) Int. Cl.[7] .............................. B01D 17/04; C02F 1/24
(52) U.S. Cl. .................... 210/221.2; 210/170; 210/218; 210/220; 210/221.1; 210/525; 210/530; 366/165.5; 366/173.2; 366/177.1; 261/77; 55/459.1
(58) Field of Search ................................ 210/703, 708, 210/170, 198.1, 218, 220, 221.1, 221.2, 525, 530; 261/77; 55/459.1; 366/165.5, 173.2, 177.1

(56) References Cited

U.S. PATENT DOCUMENTS

| | | | |
|---|---|---|---|
| 2,735,547 A | 2/1956 | Vissac | |
| 3,289,608 A | 12/1966 | Laval, Jr. | |
| 3,447,511 A | 6/1969 | Beard et al. | 123/3 |
| 3,507,397 A | 4/1970 | Robinson | |
| 3,512,651 A | 5/1970 | Laval, Jr. | |
| 3,568,837 A | 3/1971 | Laval, Jr. | 210/136 |
| 3,623,608 A * | 11/1971 | Waterman | 210/221.2 |
| 3,947,364 A | 3/1976 | Laval, Jr. | |
| 3,986,954 A * | 10/1976 | George et al. | 210/221.2 |
| 4,237,006 A | 12/1980 | Colman et al. | |
| 4,790,942 A | 12/1988 | Shmidt et al. | 210/650 |
| 5,000,848 A | 3/1991 | Hodgins et al. | 210/321.68 |
| 5,021,165 A | 6/1991 | Kalnins | 210/703 |
| 5,071,542 A | 12/1991 | Tuszko et al. | |
| 5,131,757 A | 7/1992 | Smith | |
| 5,139,662 A * | 8/1992 | Ozawa | 210/221.2 |
| 5,362,395 A | 11/1994 | Dorau et al. | 210/638 |
| 5,451,349 A | 9/1995 | Kingsley | 261/91 |
| 5,478,484 A | 12/1995 | Michaluk | 210/788 |
| 5,647,977 A | 7/1997 | Arnaud | 210/167 |
| 5,794,791 A | 8/1998 | Kindig | 209/727 |
| 5,882,530 A | 3/1999 | Chase | 210/788 |
| 5,944,998 A | 8/1999 | Rolchigo et al. | 210/654 |
| 6,024,874 A | 2/2000 | Lott | 210/512.1 |
| 6,032,931 A | 3/2000 | Plunkett | 261/77 |
| 6,080,317 A | 6/2000 | Wagner et al. | 210/652 |
| 6,106,713 A | 8/2000 | Miller et al. | 210/321.63 |
| 6,165,365 A | 12/2000 | Salyer et al. | 210/650 |
| 6,168,724 B1 | 1/2001 | Hurwitz | 210/780 |
| 6,669,843 B2 * | 12/2003 | Arnaud | 210/221.2 |
| 2003/0168211 A1 | 9/2003 | Arnaud | 166/68 |
| 2003/0173275 A1 | 9/2003 | Arnaud | 210/143 |
| 2003/0173276 A1 | 9/2003 | Arnaud | 210/143 |
| 2003/0173288 A1 | 9/2003 | Arnaud | |

OTHER PUBLICATIONS

"Fundamentals of *General Chemistry*", C. H. Sorum, University of Wisconsin, (undated).

(Continued)

Primary Examiner—David A. Reifsnyder
(74) Attorney, Agent, or Firm—Howrey Simon Arnold & White, LLP

(57) ABSTRACT

Methods and apparatus for demulsifying oil in water by dilution and impact, and for separation of the oil and suspended solids by dissolved gas floatation, are described. A produced water treating system is also described. The produced water treating system may include a dissolved gas floatation clarifier system, an oil demulsification system, and a separation system. A demulsification subsystem is also described. The apparatus may include a liquid-liquid fluid mixer and a gas generator.

27 Claims, 6 Drawing Sheets

OTHER PUBLICATIONS

"Chemical Calculations An Introduction to the Use of Mathematics in Chemistry", Sidney W. Benson, University of Southern California, (undated).
"Fluid Mechanics With Engineering Applications", R. L. Daugherty, California Institute of Technology, 1954.
"Equipment and Applications For Industry", Claude Laval Corporation, (undated).
"Industrial Process Problem Solving . . . Solids/Liquids and Liquid/Liquid Hydrocyclones for Separation, Classification, and Dewatering", © 1995 Krebs Engineers.
Demco Cyclone Separators Catalog CI–78, Aug. 15, 1978.
Geosource® The Pioneer in solids/liquid separation, 1979 Catalog.
Hydrocyclones Problem Solving in Liquid/Solids Separation, Picenso International Inc., (undated).
"Facts about liquid cyclones. Where to use them. Where not to use them. And how to specify the right cyclone for the job. With special emphasis on The Dorrclone®"; © 1979 Dorr–Oliver Incorporated.
"Porous Plastics" POREX®, © 1998 Porex Technologies Corp.
"Nitroxy Siliporite® Molecular Sieves for Medical Oxygen Concentrations" CESA, (no date).
"New Trends In Air Separation Adsorbents" by Marie–Theres Grandmougin, et al.; CECA, France, (undated).
"Clarifying Oilfield and Refinery Waste Waters by Flotation;" Journal of Petroleum Technology, pp. 426–430, dated Apr. 1973.
"Membrane Bioreactors for Wastewater Treatment;" by Tom Stephenson, et al.; dated 2000, reprinted 2001.
"New Developments in High Shear Crossflow Membrane Filtration;" Fluid/Particle Separation Journal, pp. 123–138, vol. 4, No. 1, Mar. 1991.
"The Application of Demulsification Chemicals in Recycling, Recovery and Disposal of Oily Waters;" Sam Delchad, Ph. D., Emulsions Control Inc. California (no date).
EPA Technical Bulletin, EPA 456/F–99–006R; "Nitrogen Oxides ($No_x$), Why and How They Are Controlled;" Nov. 1999.
"Superior Nitrate Removal for Treatment Plants and the Home;" Sybron Chemicals Inc.; IONIC® SR–7 Advanced Anion Exchange Resin, (undated).
Solicitation for Financial Assistance Applications No. DE–PS26–02NT41613; "Development of Technologies and Capabilities for Developing Coal, Oil and Gas Energy Resources;" p. 55, "3. Gas Flooding", (undated).

* cited by examiner

METHODS AND APPARATUS FOR OIL DEMULSIFICATION AND SEPARATION OF OIL AND SUSPENDED SOLIDS FROM PRODUCED WATER

CROSS REFERENCE TO RELATED APPLICATIONS

This application is a continuation-in-part of patent application Ser. No. 09/879,496, filed Jun. 12, 2001, entitled "Method and Apparatus for Mixing Fluids, Separating Fluids, and Separating Solids from Fluids," now U.S. Pat. No. 6,669,843, issued Dec. 30, 2003, by Johnny Amaud, which is hereby incorporated by reference in its entirety.

BACKGROUND OF THE INVENTION

1. Field of the Invention

The present invention relates to methods and apparatus for demulsifying oil in water by dilution and impact, and for separation of the oil and suspended solids by dissolved gas floatation. Saltwater brought to the surface with gas and oil from underground production wells is commonly referred to as "produced water." The methods and apparatus of the present invention are particularly suitable for demulsifying oil in produced water using dissolved methane or dissolved carbon dioxide as a diluted and for separating the oil and suspended solids from the produced water also using dissolved methane or dissolved carbon dioxide for floatation.

2. Description of Related Art

The methods and apparatus for dissolving gases in liquids disclosed in patent application Ser. No. 09/897,496, filed Jun. 12, 2001, now U.S. Pat. No. 6,669,843, issued Dec. 30, 2003, in the name of Johnny Amaud and assigned to the same assignee as the present application where liquids can be totally saturated with dissolved gases at any pressure, also provides the opportunity for improvements in the methods and apparatus for separation of both solids and fluids suspended in a second fluid by dissolved gas floatation.

Saturating a liquid as water with a dissolved gas at a high pressure then injecting the saturated liquid into other water contaminated with suspended solids or suspended liquids, such as oil, and releasing the pressure allows the gas to come out of solution as microscopic (small) bubbles that rise slowly in the liquid. As the bubbles form they attach themselves to the contaminating suspended solid particles and liquid droplets increasing the buoyancy and accelerate the rise of the particles and droplets to the surface where they can be removed. The process can be used for separating solids from fluids in dissolved air floatation clarifiers and for separating oil from water using either dissolved air or other gases, such as methane (natural gas) or carbon dioxide. While the demulsification and separation of oil and suspended solids brought to the surface in the production of oil and gas is the exemplary application described in the present invention it is understood that there are many other implementations without deviating from the intent and spirit of the present invention.

The basic requirements of a system used for gas floatation of both solids and liquids have been well defined to include introduction of finely dispersed gas bubbles into the stream to be treated, a floatation zone of minimum turbulence, and a means of removing the floated material. In addition, chemicals to aid in separation of the contaminants from the water are commonly introduced into the stream and have become part of the basic requirements of gas floatation systems. The selection of systems and methods for treating specific wastewater streams typically depend on what contaminants are present, whether the contaminants are predominantly suspended solids with a small amount of liquid contaminants or predominantly liquids with a small amount of suspended solids, and what is to be done with the contaminants removed from the treated water.

Most of the deficiencies of the present dissolved gas floatation systems are in the quality of the bubbles produced, size and cost of the apparatus used to generate the bubbles, method of introducing the bubbles into the stream of water to be treated, and the success of mixing and dispersing the demulsifying agents added by existing apparatus used.

Salt water is typically brought up to the surface with gas and oil from underground production wells. The water is typically referred to as "produced water" and sometimes as "produced brine." The oil is separated from water by flowing through a high-pressure oil-water separator. The purpose of the oil-water separation is to recover as much of oil as possible. The oil left in the produced water after this stage of separation is primarily emulsified oil mixed with suspended solids.

The produced water then has to be decontaminated for disposal. To remove the emulsified oil produced water may be placed into a tank to act as a static separator. On an offshore production platform, that tank may even be a leg supporting the platform in the ocean. The still produced water allows oil to separate and slowly rise to the surface.

Any additional free oil obtained from this process is added to the oil in production. The emulsified oil will slowly rise to just below the free oil at the top of the tank. Decontaminated water at the bottom of the tank can be removed and disposed of in accordance with the requirements of local, state, federal, and international regulations.

The layer of emulsified oil may sometimes be referred to as the "rag layer." Understanding what an emulsion comprises is a requirement for possibly recovering additional oil or decontaminating the produced water for disposal.

An emulsion in produced water is a suspension of very finely divided oil droplets dispersed in the water that does not readily separate. Under normal conditions when oil and water come into contact and allowed to stand still they will separate according to specific gravity, with the oil on top of the water. If the oil-water mixture is stirred vigorously, it will take some time for them to separate again. If a small amount of surfactant, such as a dishwashing detergent, is added to the oil-water mixture then agitated, the surfactant will coat each droplet with a thin polarized film that will cause the droplets to repel each other and prevent them from coalescing, and they will remain dispersed. The surfactants are called "emulsifiers." Certain emulsifiers are naturally occurring in produced water. The emulsified oil droplets may also be mixed with finely coated solid particles from a number of materials to further complicate the emulsion. This occurs when oil with specific gravity lower than water is attached to a particle heavier than water. The combined specific gravity may be equal to that of water and the coated particle may remain in suspension indefinitely to become part of the emulsified oil problem in produced water.

While the problem exists anywhere oil and gas is produced and processed, an offshore platform is not readily accessible and oil and gas production could perhaps be from as many as thirty wells and the quantity of produced water may be enormous. The produced water keeps coming out of the ground; therefore, the first and ultimate objective is cleaning the produced water for disposal. The second objective, of course, is to demulsify and recover as much of the emulsified oil as possible for added profit, preferably without adding chemicals to the oil. The third objective is to dispose of as little of the emulsified oil as possible to reduce costs associated with bringing it onshore for disposal.

Some of the emulsified oil and suspended oil can be separated from the produced water as an entire body by dissolved air floatation, centrifuge, or some other method. The remaining contamination may still exceed that allowed for disposal. Chemical demulsifiers in trace quantities counter the stabilizing forces in the emulsions to allow separation. The cost of using chemical demulsifiers in the large volumes of produced water would be enormous and may outweigh the benefits realized. Dilution with a light hydrocarbon product may be helpful in breaking the emulsion. The use of chemical demulsifiers and diluting agents require thorough mixing to be effective. Mechanical energy can also be used to assist in breaking the emulsion by applying forces greater than the repelling forces between the droplets to bring them together. The dynamics of fluid flow generally can be expressed by conservation of energy, momentum, and impulse. Impulse is the method used to supply the mechanical energy to overcome the repelling forces between the droplets in the present invention. The diluting agents used in the present invention are dissolved methane or dissolved carbon dioxide supplemented by a light petroleum product when it is required.

SUMMARY OF THE INVENTION

The present invention relates to methods and apparatus for demulsifying oil in water by dilution and impact, and for separation of the oil and suspended solids by dissolved gas floatation. A produced water treating system may comprise a dissolved gas floatation clarifier system as a first stage treatment to remove the suspended solids and as much of the emulsified oil as possible, an oil demulsification and separation system as a second stage treatment to demulsify and remove the oil in the produced water not removed by the first stage treatment, and associated piping.

A dissolved gas floatation clarifier system mayuemploy methane or carbon dioxide gas to produce the microscopic bubbles for floatation to remove the suspended solids and as much of the emulsified oil as possible as a first stage treatment of produced water. The dissolved gas floatation clarifier system may comprise a water inlet for the produced water to be treated with a pressurization pump and a pump bypass; a pressure regulator; a liquid-liquid fluid mixer for introduction of dissolved methane or dissolve carbon dioxide from the recycle pressure aeration system as a diluent and bubbling agent; a totally enclosed dissolved gas floatation (DGF) clarifier; a recycle pressure aeration system with a recycling pump, a pump bypass, and a fluid mixer applied as a dissolved gas generator; a pressurized methane or carbon dioxide gas supply; a storage tank for the clarified water, an outlet pump to transfer the clarified water to the oil demulsification and separation system; and associated piping.

A produced water treating system is also described. The produced water treating system may have a dissolved gas floatation clarifier system. The water treating system may also have an oil demulsification system. The water treating system may further have a separation system. Also described is a demulsification subsystem, and a liquid-liquid fluid mixer. A fluid mixer may be applied as a dissolved gas generator.

BRIEF DESCRIPTION OF THE DRAWINGS

FIG. 1 provides a schematic illustration of the overall demulsification and separation system and identifies the subsystems. FIG. 2 provides a schematic illustration of the dissolved gas floatation clarifier system. FIG. 3 provides a schematic illustration of the demulsification and separation system.

FIG. 4A provides a horizontal cross-sectional view of the fluid inlet. FIG. 4B provides a vertical cross-sectional view of the fluid flow through the fluid mixer components.

DESCRIPTION OF ILLUSTRATIVE EMBODIMENTS

Illustrative embodiments of the invention are described below as they might be employed in the use of the methods and apparatus for oil demulsification and separation of suspended solids and oil from produced water. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Further aspects and advantages of the various embodiments of the invention will become apparent from consideration of the following description and drawings.

Figure 1:
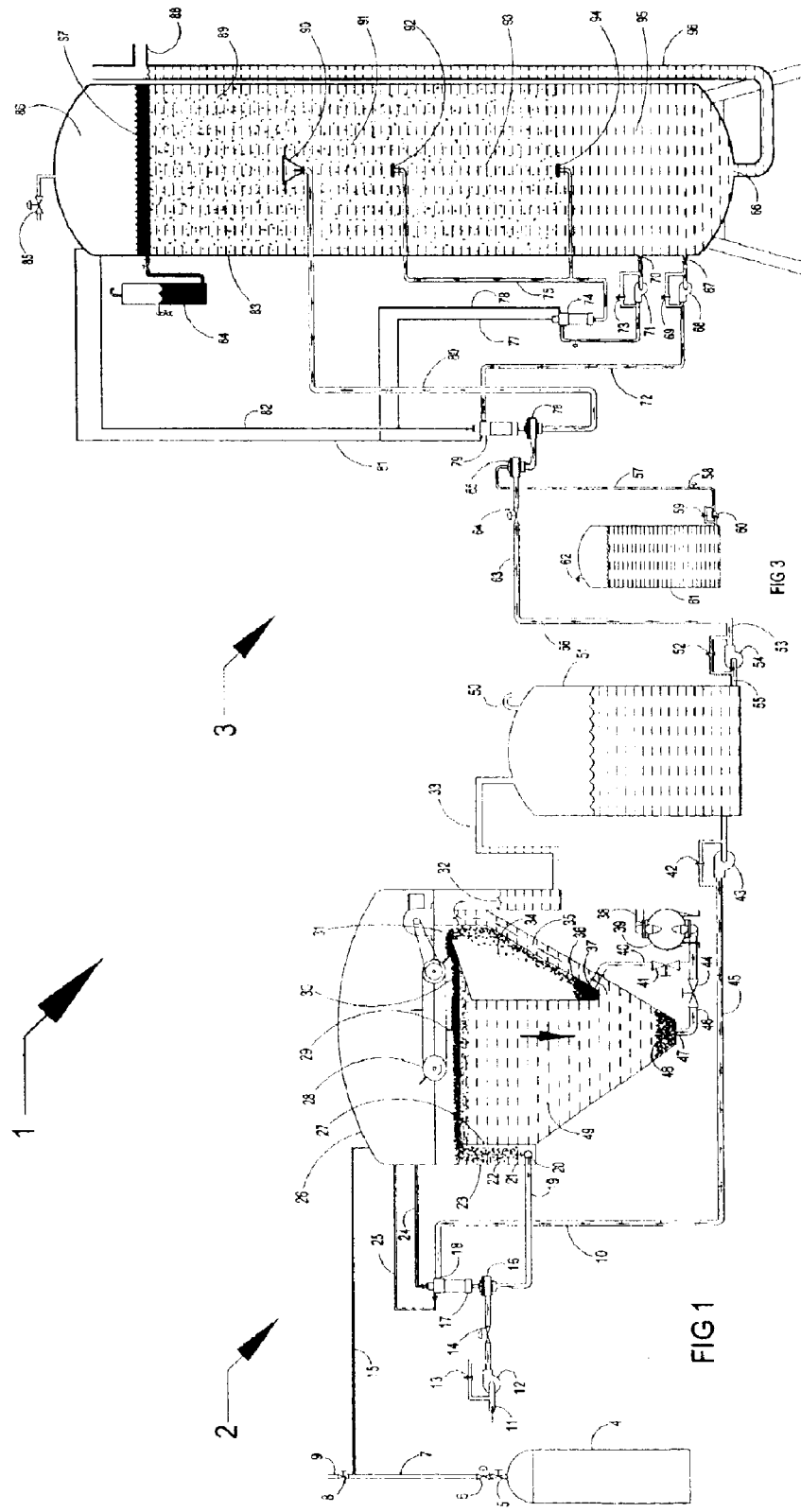
FIGS. 1–3 are schematic illustrations identifying major system components of an oil demulsification and separation system for removing emulsified oil and suspended solids from produced water before disposal employing a dissolved gas floatation clarifier system as the first phase of treatment and a demulsification and separation system as the second phase of treatment in accordance with the present invention.

FIG. 1 depicts in a schematic illustration a produced water treating system 1 in accordance with the present invention. The produced water treating system 1 comprises a dissolved gas floatation clarifier system 2 as a first stage treatment to remove the suspended solids and as much of the emulsified oil as possible, an oil demulsification and separation system 3 as a second stage treatment to demulsify and remove the oil in the produced water not removed by the first stage treatment, and associated piping.

Figure 2:
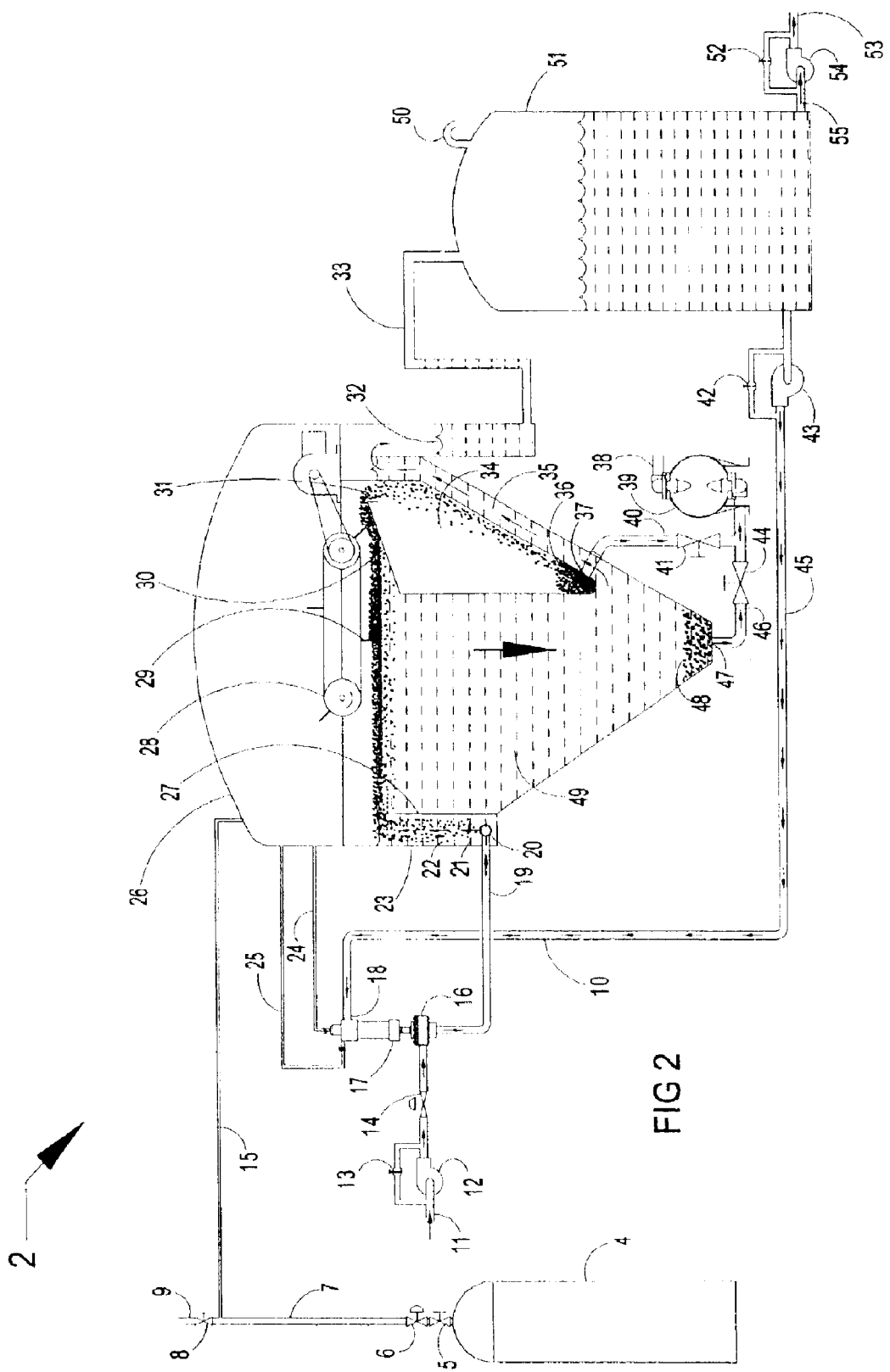

FIG. 2 depicts in a schematic illustration a dissolved gas floatation clarifier system 2 employing methane or carbon dioxide gas to produce the microscopic bubbles for floatation to remove the suspended solids and as much of the emulsified oil as possible as a first stage treatment of produced water. The dissolved gas floatation clarifier system 2 comprises a water inlet 11 for the produced water to be treated with a pressurization pump 12 and a pump bypass 13; a pressure regulator 14; a liquid-liquid fluid mixer 6 for introduction of dissolved methane or dissolved carbon dioxide from the recycle pressure aeration system as a diluent and bubbling agent; a totally enclosed dissolved gas floatation (DGF) clarifier 26; a recycle pressure aeration system with a recycling pump 43, a pump bypass 42, and a fluid mixer applied as a dissolved gas generator 17; a pressurized methane or carbon dioxide gas supply 4; a storage tank 51 for the clarified water, an outlet pump 54 to transfer the clarified water to the oil demulsification and separation system 3 in FIG. 1; and associated piping.

The totally enclosed dissolved gas clarifier 26 may comprise an inlet manifold 20, a retention chamber 23 where the microscopic bubbles form and become attached to the contaminants, a floatation cell 49 to allow the contaminants to float with minimum turbulence, a rake assembly 28 with a series of rakes 29 and a variable speed drive to skim the floating contaminants off the top of the water, a sludge collection chamber 34, a passageway 35 for the clarified water to exit the floatation cell 49, an outlet collection chamber 32 connected to an elevated pipe 33 to maintain a head pressure and retain the gas inside the enclosed dissolved gas floatation clarifier 26, and a sludge pump 39 to remove the accumulated sludge 36 and 48.

The recycle pressure aeration system may comprise a pump 43 to furnish the recycled water at the pressure required to dissolve the amount of gas needed for system operation, a pump bypass 42 to regulate the pump 43 pressure and flowrate, a fluid mixer applied as a dissolved gas generator 17 with a built in venturi to draw in the gas for dissolving into the water, and associated piping.

As a petroleum product, dissolved methane gas becomes a light liquid with an affinity for the emulsified oil in the water making it an acceptable diluent for demulsification of the oil. The viscosity of heavy oil can be reduced by absorption of carbon dioxide ($CO_2$) also making the carbon dioxide a good diluent for demulsification of the oil. An advantage of methane is its general availability and low cost at the production wells where the produced water is to be treated. A disadvantage of using methane around other petroleum is its flammability. An advantage of the carbon dioxide is that it is not flammable. The selection of one over the other is determined by consideration of availability, economics, safety, and its effectiveness in the specific application based on pilot plant operations.

The pressurized gas supply 4 fills the dissolved gas floatation clarifier 26 with the low-pressure methane or carbon dioxide gas. The gas flows out of the pressurized gas supply 4 through shutoff valve 5, pressure regulator 6, lines 7 and 15, and into the dissolved gas flotation clarifier 26. The gas pressure in the enclosed dissolved gas flotation clarifier 26 is maintained to a preset level by the pressure regulator 6. A shutoff valve 8 and an outlet 9 are provided to supply the low-pressure gas to the oil demulsification and separation system 3 in FIG. 1.

Produced water containing suspended solids and emulsified oil enters the dissolved gas floatation clarifier system 2 through the water inlet 11, is pressurized by pump 12 and flows into the fluid mixer 6 where the dissolved methane or carbon dioxide gas is introduced.

Clarified water is drawn by the recycling pressure pump 43 and pumped at the selected pump's operating pressure through lines 45 and 10 into the fluid mixer applied as a dissolved gas generator 17 and saturated with gas drawn by a venturi built into the dissolved gas generator 17 from the dissolved gas floatation clarifier 26. The operation pressure of the water is much higher than the gas pressure, and any excess gas is separated from the recycled water in the dissolved gas generator 17 and returned to the dissolved gas floatation clarifier 26. The recycled water saturated with methane or carbon dioxide flows out the bottom of the dissolved gas generator 17 and into the fluid mixer 16 where it is mixed with the incoming produced water. The diluent (dissolved gas) and the high impact caused by the fluid mixer 16 breaks the oil emulsion inside the fluid mixer 16. The produced water flows out of fluid mixer 16 through piping 19 and into manifold 20.

The mixture of water 21 is released from the manifold 20 into the retention chamber 23 where the gas comes out of solution to form microscopic bubbles 22. The time in the retention chamber 23 allows the microscopic bubbles to become attached to the suspended solid particles and oil droplets and float. The produced water flows upward in the retention chamber 23 and over a weir 27 into the floatation cell 49.

A rake assembly 28 skims the surface of the water with a series of individual rakes 29 and carries the solids and droplets of oil up an incline 30 and allows them to spill over 31 into a sludge collection chamber 34 separating the floating suspended solids and oil droplets from the water. A small percentage of the suspended solids 48 settle to the bottom of the floatation cell 49.

The clarified produced water flows downward in the floatation cell 49 and up a passageway 35 and spills over into an outlet collection chamber 32. The clarified produced water flows out the outlet collection chamber 32 through piping 33 and into a storage tank 51. Some of the clarified water is recycled through the recycle pressure aeration system and saturated to supply the diluent and gas bubbles for floatation as previously described. The sludge 36 in the sludge collection chamber 29 and the sludge 48 settled in the bottom of the floatation cell 49 are periodically removed. The sludge is removed from the sludge chamber 34 by turning the sludge pump 39 on and opening the selection valve 41. The sludge 36 is drawn by the sludge pump 39 through the sludge outlet 37 and piping 40 when selection valve 41 is opened and discharged from the system through pump outlet 38. The sludge 48 settled on the bottom of the floatation cell 49 is drawn by the sludge pump 39 through the sludge outlet port 47 and piping 46 when selection valve 44 is opened and is discharged from the system through pump outlet 38.

Figure 3:
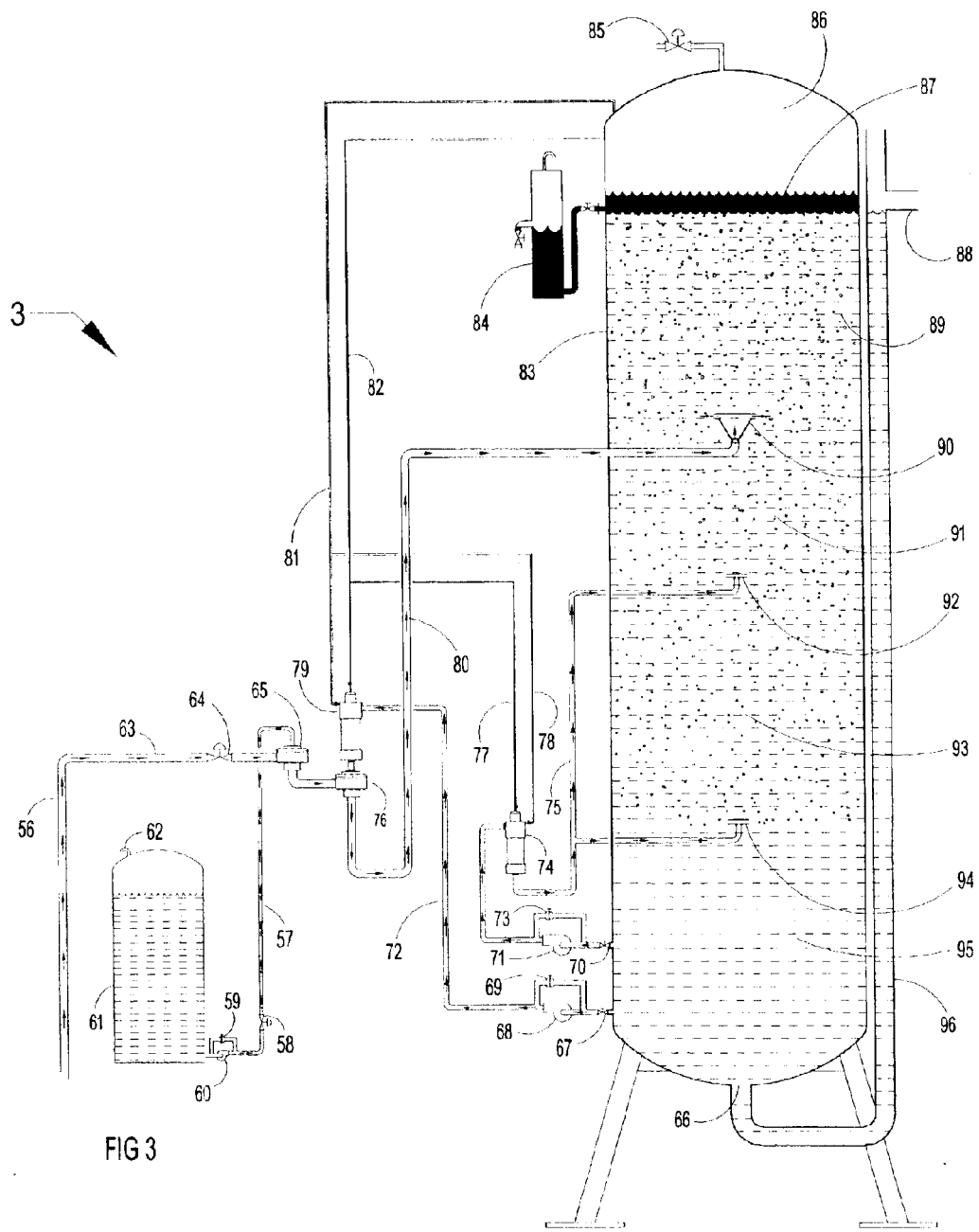

FIG. 3 depicts in a schematic illustration an oil demulsification and separation system 3 as a second stage treatment of produced water to demulsify and separate the oil in the produced water not removed in the first stage treatment by the dissolved gas floatation clarifier system 2 in accordance with the present invention. The oil demulsification and separation system 3 may comprise a demulsification subsystem where the diluents are introduced and mixed with a high impact to break the emulsion and a dissolved gas separation subsystem to remove the oil from the water by floatation.

The demulsification subsystem may comprise inlet piping 56 and 63 where the incoming produced water is received from the dissolved gas floatation clarifier system 2 (FIG. 1); a pressure regulator 64, a light petroleum supply system with a with a storage tank 61, a light petroleum feed pump 60, a pump bypass 59, and a pressure regulator 58; a second liquid-liquid fluid mixer 65, a liquid-gas fluid mixer applied as a dissolved gas generator 79 to dissolve the methane or carbon dioxide gas used as a diluent and bubbling agent; a pump 68 with a bypass 69 to supply the water for the dissolved gas generator 79; piping 80 through which methane or carbon dioxide gas is drawn from the top of tank 83, piping 82 through which excess methane or carbon dioxide gas is returned to tank 83; and a distributor 90 to disperse the water-oil mixture in the separation system to separate the oil from the produced water.

The dissolved gas separation subsystem may comprise a tank 83 where the oil is separated from the produced water; a circulating pump 71 with a bypass 73, and an outlet port and valve 70; a liquid-gas fluid mixer applied as a dissolved gas generator 74; and three distributors 90, 92, and 94 inside the tank 83 to disperse the methane or carbon dioxide gas bubbles in the water as they come out of solution and rise to separate the oil by floatation.

Referring to FIG. 3, produced water enters the system under pressure through inlet piping 56 and 63, flows through the pressure regulator 64, and into fluid mixer 65. The operating pressure under which the oil demulsification system is to be operated is related to both the amount of emulsified oil in the produced water and the head pressure of the column of water in the tank 83 at the point where the oil-water mixture is to be injected through the distributor 90. The head pressure at the injection point plus sufficient additional pressure added to allow injection is the proper operating pressure of the demulsification system.

If the operating pressure is much too high, any excess dissolved gases above that required for demulsification of the oil would burst out of solution with almost explosive force that would cause turbulence in the tank 83 and interrupt oil-water separation. If the operating pressure is below the head pressure, the oil-water could not be injected into the tank 83. If the head pressure does not allow enough methane or carbon dioxide gas to be dissolved in the water for total oil demulsification, the light petroleum diluent is used to supplement the methane or carbon dioxide. The operating parameters are determined by laboratory analysis of the produced water to be treated and by a small pilot (test) plant operation with the specific produced water having the oil to be demulsified from each offshore production platform.

Again referring to FIG. 3, the produced water flows into the fluid mixer 65. When it is required, a light petroleum diluent from the storage container 61 is drawn by the feed pump 60 and flows through pressure regulator 58 and is injected into the fluid mixer 65 through piping 57 and thoroughly mixed with the incoming produced water stream as the first stage of treatment. The mixture of produced water and light petroleum diluent flows out of the fluid mixer 65 and into fluid mixer 76 for the second stage of treatment.

Clarified water is drawn from the lower part of tank 83 through the outlet valve 67 by pump 68 and injected into the dissolved gas generator 79 through piping 72 where the water is saturated with dissolved methane or carbon dioxide gas drawn from the top of tank 83 through piping 82. The excess methane or carbon dioxide gas not dissolved is returned to the top of tank 83 through piping 82. The water saturated with dissolved methane or carbon dioxide flows out of the dissolved gas generator 79 and into fluid mixer 76 where it is thoroughly mixed with the incoming produced water for the second stage of treatment. The treated produced water-oil mixture flows out of fluid mixer 76 to the distributor 90 through piping 80 and is dispersed inside tank 83 to come out of solution and rise through the water 89 to separate the oil from the water as a first stage of separation.

Clarified water is also drawn from the lower part of tank 83 through the outlet valve 70 by pump 71 and is injected into the dissolved gas generator 74 where the water is saturated with dissolved methane or carbon dioxide gas drawn from the top of tank 83 through piping 78 and 81. The excess methane not dissolved is returned to the top of tank 83 through piping 77 and 82. The water saturated with dissolved methane or carbon dioxide gas flows out of the dissolved gas generator 74 to the two distributors 92 and 94 and is dispersed inside tank 83 to come out of solution and rise through the water to separate the oil from the water 91 above distributor 92 as a second stage of separation and through the water 93 above distributor 94 as a third stage of separation.

The space 86 above the floating oil 87 in tank 83 is used to retain the methane or carbon dioxide gas that bubbles out of the water for reuse. The methane or carbon dioxide lost during the process is replaced automatically through gas pressure regulator 85 when the gas pressure drops below the set point of the regulator. The pressure inside the tank 83 is maintained at a very low pressure, typically at approximately 6 ounces per square inch. The floating oil is periodically drawn off the top of the water through an oil outlet chamber 84 that maintains an oil head pressure on the gas to prevent its escape from the tank 83. The water from the demulsification subsystem enters the tank 83 through distributor 90 and flows downward as the oil flows upward by floatation as the dissolved gas comes out of solution when exposed to the lower pressure in the tank 83. The water flows out of tank 83 through the bottom outlet port 66, flows up the outlet piping 96, and exits the system through outlet 88 at the top of piping 96.

The fluid mixers used as liquid-liquid mixers 16, 65, and 76 and as dissolved gas generators 17, 74, and 79 may correspond structurally and functionally to the radial-grooved ring mixer disclosed in patent application Ser. No. 09/879,496, filed Jun. 12, 2001, now U.S. Pat. No. 6,669,843, issued Dec. 30, 2003, in the name of Johnny Arnaud and assigned to the same assignee as the present application. The fluid mixers are shown in FIGS. 1–3. While the radial-grooved ring mixers are described herein, the foregoing co-pending application is hereby incorporated herein by reference and can be referred to for further structural detail.

Figure 4A:
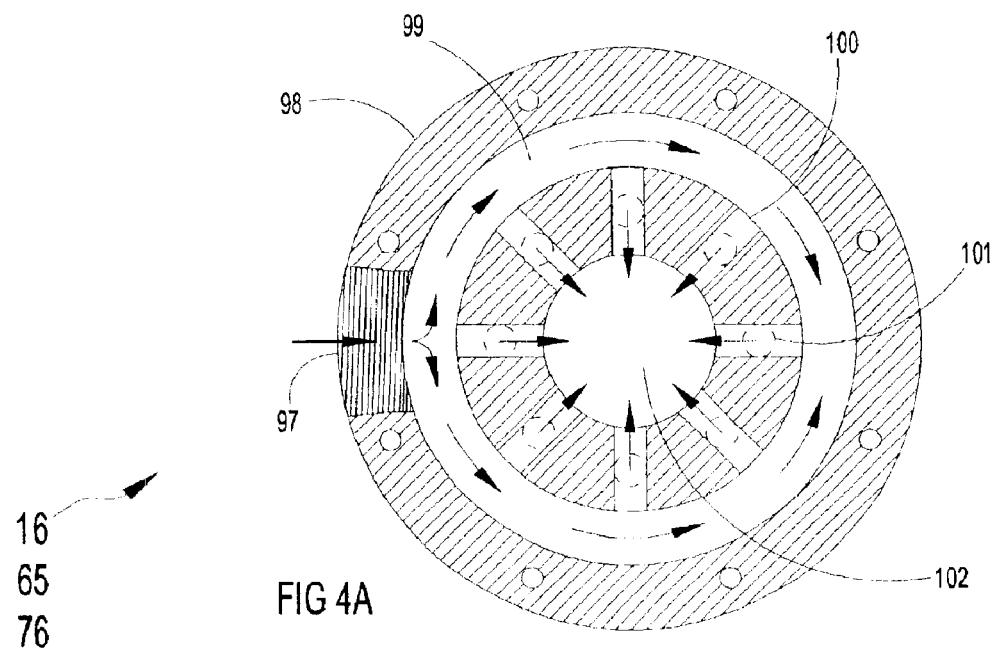
FIGS. 4A and 4B provide cross-sectional illustrations of fluid mixer for mixing liquids with liquids employing a radial-grooved ring.
Figure 4B:
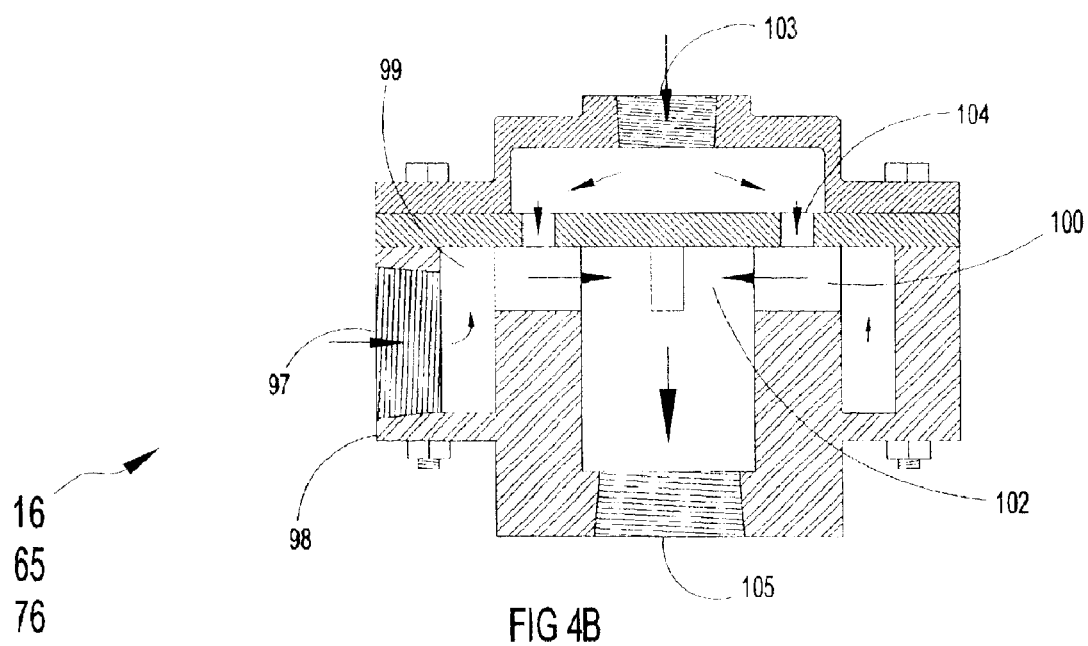

FIGS. 4A and 4B are fluid diagrams illustrating the operating principles of a liquid-liquid fluid mixer. FIG. 4A depicts a horizontal cross-sectional view of the fluid inlet to the fluid mixer 16, 65, or 76 illustrating the radial-groove ring 98, the position of the orifices 101 over the radial grooves 100, and an impact zone 102 to which the radial grooves 100 are directed. FIG. 4B provides a vertical cross-sectional view of the fluid mixer 16, 65, or 76 assembly that may comprise a top housing 103, a plate with orifices 104, a radial-grooved ring 98 with an impact zone 102. The arrows indicate the direction of fluid flow. The first liquid, generally the larger stream, enters the mixer 16, 65, or 76 through the side inlet 97, flows around the distribution channel 99, and is divided and flows through the radial grooves where it is mixed with the second fluid from the top housing 103 entering through the orifices 104 into each first-liquid stream. The liquid-liquid mixture is then injected at high velocity into the impact zone 102 to become thoroughly mixed. The mixed liquids flow downward and out of the fluid mixer through the outlet 105.

Figures 5, 6:
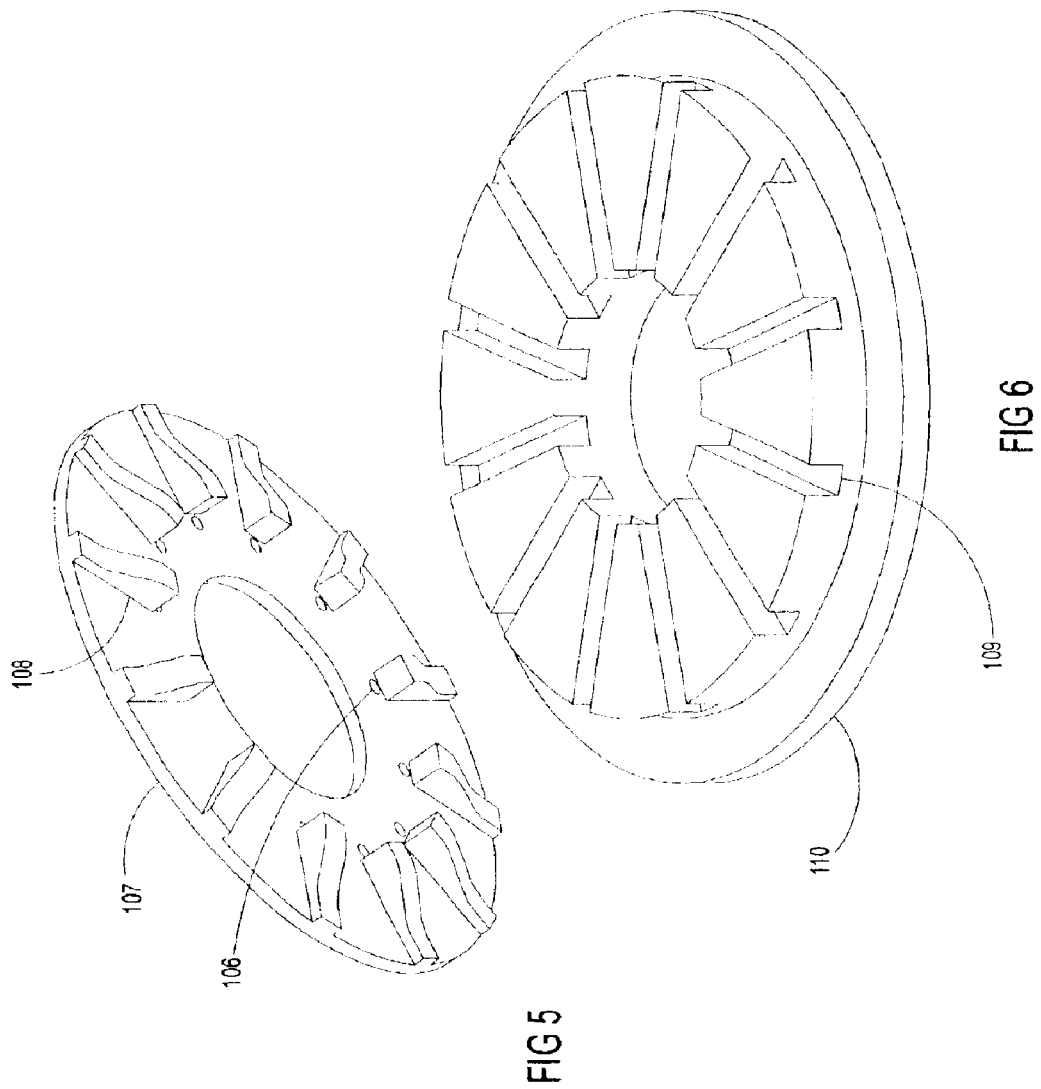
FIGS. 5 and 6 provide three-dimensional illustrations of a typical radial-grooved ring and a combination venturi-orifice ring used in fluid mixing.
Figure 7:
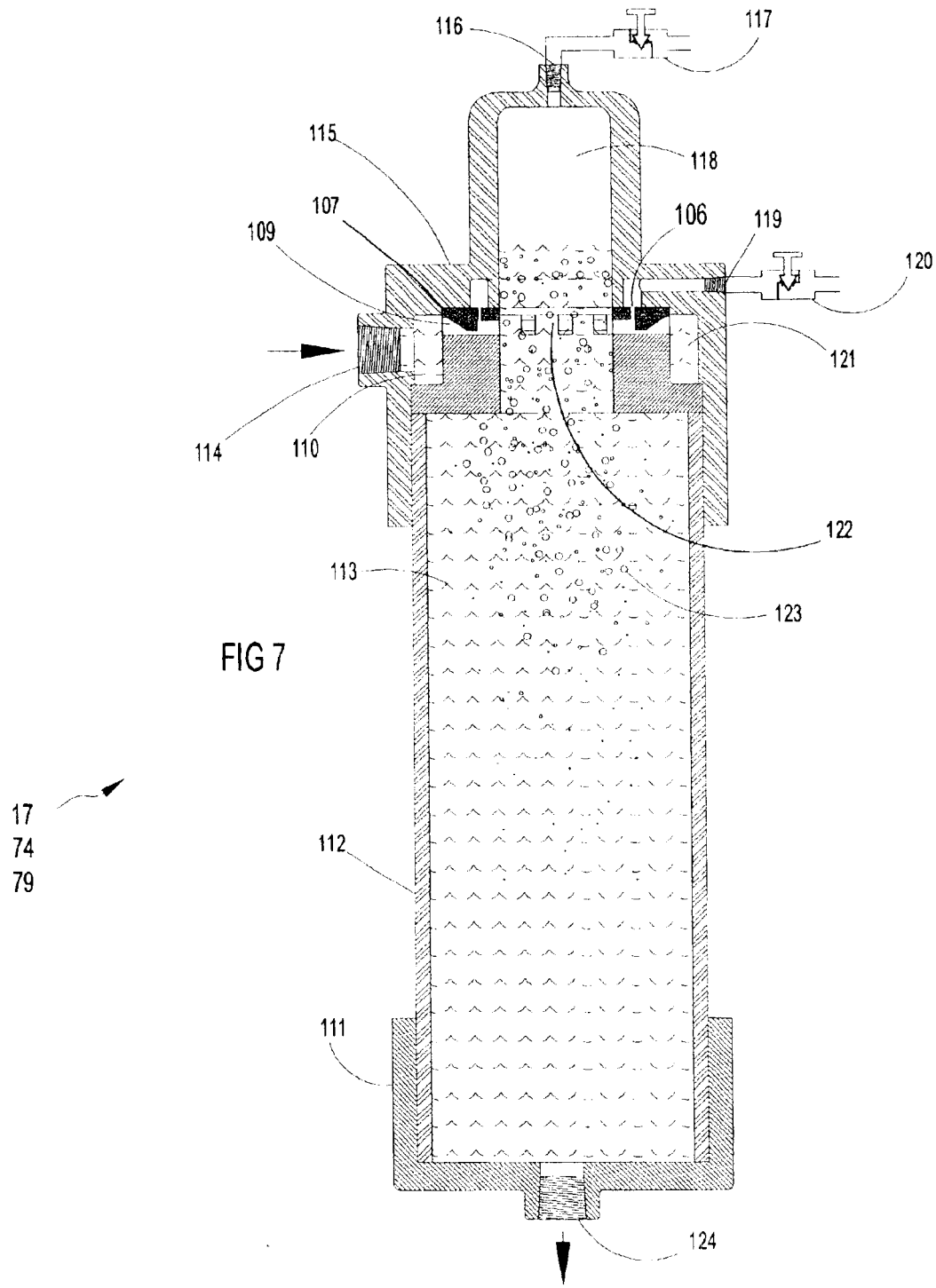
FIG. 7 is a fluid diagram of a fluid mixer employing a radial-grooved ring applied as a dissolved gas generator with a combination venturi-orifice ring positioned with the venturi and orifice ports in each groove in order to draw a gas into each stream by suction.

FIGS. 5–7 depict a fluid mixer applied as a dissolved gas generator 17, 74, or 79 employing dynamic forces of fluid flow obtained with a radial-grooved ring where atmospheric air or some other low pressure gas to be dissolved into a liquid is drawn into the mixer by venturi suction built into the mixer. FIGS. 5 and 6 provide three-dimensional illustrations of a typical radial-grooved ring 110 and a combination venturi-orifice ring 107 having 12 orifices 106 and 12 venturi 108 to fit into the radial grooves 109 of the radial-grooved ring 110. FIG. 7 provides a vertical cross-sectional view of the fluid mixer 17, 74, or 79 assembly comprising a cylindrical donut housing 115, a combination venturi-orifice ring 107, a radial-grooved ring 110, a lower cylinder 112, and a lower cap 111. The cylindrical donut housing 115 has a gas separation chamber 118 to separate excess gases from the liquids so the gases can by discharged while retaining the liquid. The center of the radial-grooved ring 110 serves as an impact zone 122 into which the multiple streams of the liquid-gas mixture flowing at high velocity are directed to collide with each other. An inlet gas-metering valve 120 connected to the gas inlet 119 of the cylindrical donut housing 115 regulates the amount of gas supplied during operation. An outlet gas-metering valve 117 connected to the gas outlet 116 of the cylindrical donut housing 115 regulates the amount of gas discharged from the device during operation.

Referring to FIG. 7, the liquid enters through inlet 114 and flows into the distribution channel 121 around the radial-grooved ring 110. The liquid then flows through the radial grooves 109 where gas is drawn through the orifice ports 106 into each liquid stream as the liquid flows by the venturi. The liquid-gas mixture in each of the grooves 109 is then injected at high velocity into the impact zone 122 to collide with each other. The liquid becomes saturated with gas at this point. The inlet gas-metering valve 120 regulates the amount of gas supplied. The saturated liquid 113 flows downward out of the impact zone 122 and into the larger area of the lower cylinder 112 where the velocity is decreased. The excess gas bubbles 123 flow upward and return to the impact zone 122. The saturated liquid continues to flow downward and exits through the outlet 124. The excess bubbles flow up through the impact zone 122, and the gas is separated from the liquid in the separation chamber 118 and released from the unit through the outlet gas-metering valve 117.

The amount of gas retained in the separation chamber 118 regulates the liquid level in the apparatus. The amount of gas released is adjusted to maintain the liquid level just above the impact zone 122, and only a small amount of gas has to be released from the chamber 118. The fluid mixture 17, 74, or 79 is extremely effective at saturating liquids with gases with only five parts that can be manufactured in many sizes at low cost. It can be manufactured in metal or in plastic either machined or injection molded.

What is claimed is:

1. A water treating system for treating produced water containing suspended solids and emulsified oil, the water treating system comprising:

a dissolved gas floatation clarifier system to remove suspended solids and emulsified oil as sludge, the dissolved gas floatation clarifier system adapted to separate the produced water into clarified water and sludge of suspended solids and emulsified oil, and an oil demulsification and separation system to demulsify and remove oil remaining in the clarified water from the dissolved gas floatation clarifier system, in which the dissolved gas floatation clarifier system comprises:

a dissolved gas floatation clarifier having a manifold, a clarified water outlet, and a sludge collection chamber to collect sludge, the dissolved gas clarifier being enclosed;

a storage tank for collecting clarified water exiting the outlet of the dissolved gas floatation clarifier;

a pressurized gas supply in fluid communication with the dissolved gas floatation clarifier to supply pressurized gas to the dissolved gas clarifier;

a recycle pressure aeration system adapted to pressurize the clarified water from the storage tank with a recycling pump;

a dissolved gas generator adapted to dissolve gas from the dissolved gas clarifier into the pressurized clarified water from the recycle pressure aeration system to form a fluid saturated with dissolved gas to serve as emulsified oil diluent and to supply flotation bubbles to the dissolved gas flotation clarifier;

a water pump adapted to pressurize the produced water; and a liquid-liquid fluid mixer adapted to mix the pressurized produced water from the water pump with the fluid saturated with dissolved gas exiting the dissolved gas generator to dilute the emulsified oil and form a mixture of demulsified oil and excess dissolved gas with water, the liquid-liquid fluid mixer providing the mixture to the manifold of the dissolved gas floatation clarifier, wherein the dissolved gas floatation clarifier separates the mixture from the liquid-liquid mixer into sludge and clarified water, the sludge being collected in the sludge collection chamber, the clarified water collected in the storage tank.

2. The water treating system of claim 1 in which a pressure of the gas in the enclosed dissolved gas floatation clarifier is maintained to a preset level by a pressure regulator.

3. The water treating system of claim 1, in which the dissolved gas floatation clarifier further comprises:

a retention chamber for receiving the mixture exiting the manifold, in which the dissolved gas comes out of solution to form gas bubbles, the gas bubbles attaching to float suspended solids and demulsified oil as contaminants;

a floatation cell for allowing the contaminants to float above the water in the floatation cell;

a rake assembly adapted to move the floating contaminants from the floatation cell into a sludge collection chamber; and a passageway having an outlet for clarified water to exit the dissolved gas floatation clarifier.

4. The water treating system of claim 3 in which the floatation cell has a settling zone, the floatation cell being conical with a lower end, contaminants in the settling zone settling in the lower end of the conical floatation cell.

5. The water treating system of claim 4 further comprising a sludge pump to selectively remove contaminants as sludge from the sludge collection chamber through a sludge outlet.

6. The water treating system of claim 5 in which the sludge pump selectively removes contaminants settled on the bottom of the floatation cell as sludge through a sludge outlet port.

7. The water treating system of claim 4 in which the sludge container is separated from the floatation cell by an incline.

8. The water treating system of claim 7 in which the retention chamber is separated from the floatation cell by a weir.

9. The water treating system of claim 4 in which the rake assembly further comprises:

a plurality of rakes; and a variable speed drive motor, the plurality of rakes adapted to rake the floating contaminants as sludge off the water in the floatation cell and into the sludge collection chamber.

10. The water treating system of claim 1 wherein the gas in the pressurized gas supply is either carbon dioxide or methane.

11. The water treating system of claim 1, in which the dissolved gas generator further comprises:
an upper cylindrical donut housing with a fluid inlet for the clarified water, the upper cylindrical donut housing having a gas separation chamber to separate excess gases from liquids for discharging gas through a gas outlet on the upper housing;
a grooved ring having a plurality of grooves, an impact zone being located below the grooved ring, the grooved ring being concentric to the upper cylindrical donut housing, the grooved ring having an outer diameter on a first end that is smaller than a diameter of the upper cylindrical donut housing, thus defining a distribution channel;
a venturi-orifice ring adapted to inject gas from the dissolved gas clarifier into liquid leaving the grooves; and
a cylinder concentric with the grooved ring, the cylinder in fluid communication with the distribution channel via the grooves, a saturated liquid outlet being located a bottom of the cylinder, to form the fluid saturated with gas.

12. The water treating system of claim 1, in which the oil demulsification and separation system comprises:
a demulsification subsystem having a first stage adapted to selectively mix clarified water from the dissolved gas floatation system at a pressure sufficient to allow flow into a low pressure tank; and
a dissolved gas separation subsystem adapted to receive fluid from the demulsification system, and separate the oil and gas from water by floatation.

13. The water treating system of claim 1, in which the liquid mixer further comprises:
an upper donut housing with a first fluid inlet in the upper housing;
a ring having a plurality of grooves, the ring being concentric to the upper donut housing, the ring having an outer diameter on a first end that is smaller than a diameter of the donut housing thus defining a distribution channel;
an orifice ring adapted to inject a second liquid into the first liquid leaving the grooves; and
a cylinder concentric with the ring and surrounded by the ring, the cylinder in fluid communication with the distribution channel via the grooves, a liquid outlet being located at the bottom of the cylinder.

14. A water treating system for treating produced water containing suspended solids and emulsified oil, the water treating system comprising:
a dissolved gas floatation clarifier system to remove suspended solids and emulsified oil as sludge, the dissolved gas floatation clarifier system adapted to separate the produced water into clarified water and sludge of suspended solids and emulsified oil, and
an oil demulsification and separation system to demulsify and remove oil remaining in the clarified water from the dissolved gas floatation clarifier system, the oil demulsification and separation system having
a first fluid mixer adapted to selectively mix clarified water from the dissolved gas floatation clarifier system with light petroleum to selectively produce a mixture of water and light petroleum diluent to mix with any trace demulsified oil;
a low pressure tank adapted to store fluid and having a lower portion separated from an upper space by a layer of floating oil, the upper space adapted to collect gas;
a dissolved gas generator adapted to mix water from the lower portion of the low pressure tank with gas from the upper space of the low pressure tank to produce saturated water; and
a second fluid mixer adapted to mix the mixture of water and light petroleum diluent from the first fluid mixer with water saturated with dissolved gas exiting from the dissolved gas generator to dilute the emulsified oil and form a mixture of oil and excess dissolved gas with water, the oil-water-excess dissolved gas mixture distributed in the fluid of the low pressure tank via an upper distributor,
wherein upon entering the low pressure tank from the upper distributor, the gas comes out of solution to separate oil by floatation, the oil floating above the water in the low pressure tank, the gas collected in the upper space of the low pressure tank above the floating oil, and the water exiting the lower portion of the low pressure tank via a bottom outlet port.

15. The water treating system of claim 14 further comprising:
a second dissolved gas generator adapted to mix water pumped from the lower portion of the tank with gas from the upper space of the tank, the water saturated with gas exiting the second dissolved gas generator and entering the low pressure tank through a plurality of lower distributors, each plurality of lower distributors being located below the upper distributor in the low pressure tank.

16. The water treating system of claim 15, in which the second dissolved gas generator further comprises:
a second upper cylindrical donut housing with a second fluid inlet for the water pumped from the lower portion of the low pressure tank, the second upper cylindrical donut housing having a second gas separation chamber to separate excess gases from liquids for discharging gas through a second gas outlet on the second upper housing;
a second grooved ring having a plurality of grooves, a second impact zone being located below the second grooved ring, the second grooved ring being concentric to the second upper cylindrical donut housing, the second grooved ring having an outer diameter on a first end that is smaller than a diameter of the second upper cylindrical donut housing, thus defining a second distribution channel;
a second venturi-orifice ring adapted to inject gas from the upper space of the tank into liquid leaving the grooves; and
a second cylinder concentric with the second grooved ring, the second cylinder in fluid communication with the distribution channel via the grooves, a second saturated liquid outlet being located a bottom of the cylinder, to form the water saturated with gas.

17. The water treating system of claim 14, in which the liquid mixer further comprises:
an upper donut housing with a first fluid inlet in the upper housing;
a ring having a plurality of grooves, the ring being concentric to the upper donut housing, the ring having an outer diameter on a first end that is smaller than a diameter of the donut housing thus defining a distribution channel;

an orifice ring adapted to inject a second liquid into the first liquid leaving the grooves; and a cylinder concentric with the ring and surrounded by the ring, the cylinder in fluid communication with the distribution channel via the grooves, a liquid outlet being located at the bottom of the cylinder.

18. The water treating system of claim 14 in which the floating oil is selectively removed via an oil outlet chamber, the oil outlet chamber adapted to maintain an oil head pressure on the gas collected in the upper space of the low pressure tank.

19. The water treating system of claim 14 in which excess gas not mixed in the dissolved gas generator is returned to the upper space of the low pressure tank.

20. The water treating system of claim 14 in which the gas is methane or carbon dioxide.

21. The water treating system of claim 14 in which the clarified water from the dissolved gas clarifier floatation system enters the first mixer at a predetermined pressure controlled by a pressure regulator, wherein the predetermined pressure is a function of a head pressure at the upper distributor and an amount of emulsified oil in the clarified water exiting the dissolved gas clarifier system.

22. The water treating system of claim 14 in which the light petroleum is provided by a light petroleum supply system, the light petroleum supply system further comprising a light petroleum storage tank;

a light petroleum feed pump;

a light pump bypass; and a pressure regulator, wherein the light petroleum is pumped from the light petroleum storage tank through the petroleum feed pump, and into the first fluid mixer.

23. The water treating system of claim 14 in which the pressure within the low pressure tank is maintained at a value below six ounces per square inch.

24. The water treating system of claim 14 in which the floating oil is selectively drawn out of the low pressure tank through an oil outlet chamber to maintain an oil head pressure.

25. The water treating system of claim 14, in which the dissolved gas generator further comprises:

an upper cylindrical donut housing with a fluid inlet for the water pumped from the lower portion of the low pressure tank, the upper cylindrical donut housing having a gas separation chamber to separate excess gases from liquids for discharging gas through a gas outlet on the upper housing;

a grooved ring having a plurality of grooves, an impact zone being located below the grooved ring, the grooved ring being concentric to the upper cylindrical donut housing, the grooved ring having an outer diameter on a first end that is smaller than a diameter of the upper cylindrical donut housing, thus defining a distribution channel;

a venturi-orifice ring adapted to inject gas from the from the upper space of the low pressure tank into liquid leaving the grooves; and a cylinder concentric with the grooved ring, the cylinder in fluid communication with the distribution channel via the grooves, a saturated liquid outlet being located a bottom of the cylinder, to form the saturated water.

26. The water treating system of claim 14 in which the outlet port is located substantially at a bottom of the low pressure tank, the water is pumped from the lower portion of the low pressure tank to the dissolved gas generator, and the saturated water from the dissolved gas generator also provides flotation bubbles to the low pressure tank.

27. The water treating system of claim 14, in which the oil demulsification and separation system comprises:

a demulsification subsystem having a first stage adapted to selectively mix clarified water from the dissolved gas floatation system at a pressure sufficient to allow flow into a low pressure tank; and a dissolved gas separation subsystem adapted to receive fluid from the demulsification system, and separate the oil and gas from water by floatation.

* * * * *